United States Patent Office 2,981,306
Patented Apr. 25, 1961

2,981,306

APPARATUS FOR PRODUCING TURNED OVER FLANGE ON THE END OF A PIPE

Karl Johan William Ahlberg, Alvagen 57, and Karl Einar Andersson, Alvagen 18, both of Sollentuna 3, Sweden Filed Sept. 26, 1958, Ser. No. 763,663

6 Claims. (Cl. 153—81)

This invention relates to an apparatus for producing flanges on the ends of sections of pipe or metal tubing, such as copper tubing, and which flanges are employed in connection with couplings used for uniting the flanged sections of the pipe or tubing.

Very often the pipes or tubes to be flanged are part of an installed water system and it is occasionally necessary to replace worn or deteriorated sections of the piping. By flanging the ends of the parts of the piping to be installed and also by flanging the parts of the piping remaining in place, and using coupling devices, the new section is readily fitted in place and connected to the old piping with leakproof joints.

It is an object of the present invention to provide a pipe-flanging device of relatively simple construction, one which shall be portable in nature and operative at the point of piping installation whereby the installed piping, as well as that to be installed, can be readily flanged in the required manner.

It is an object of the invention to provide an apparatus of this character which will form a specially-shaped, arcuate annular flange at the end of a section of pipe or tubing, permitting the use of certain types of coupling devices.

With these and other objects to be hereinafter set forth in view, we have devised the arrangement of parts to be described and more particularly set forth in the claims appended hereto.

Figure 1:
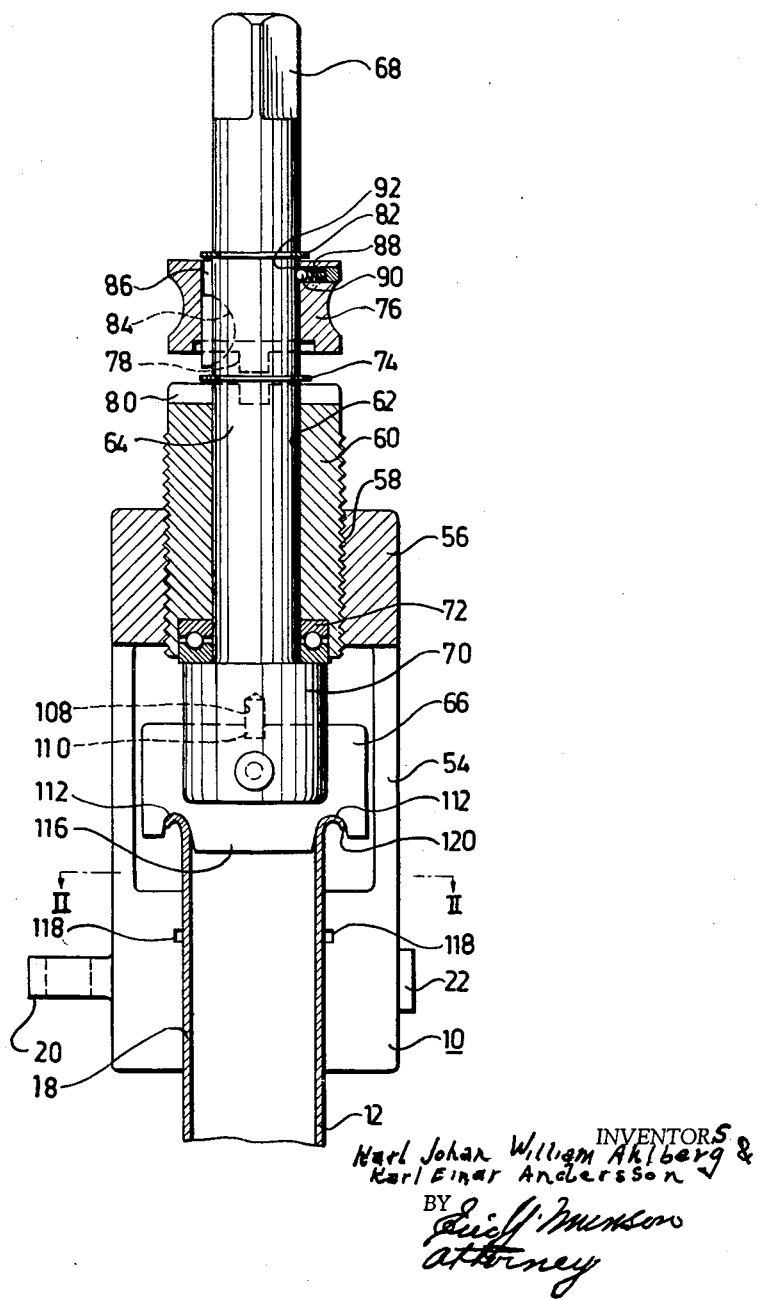
Figure 2:
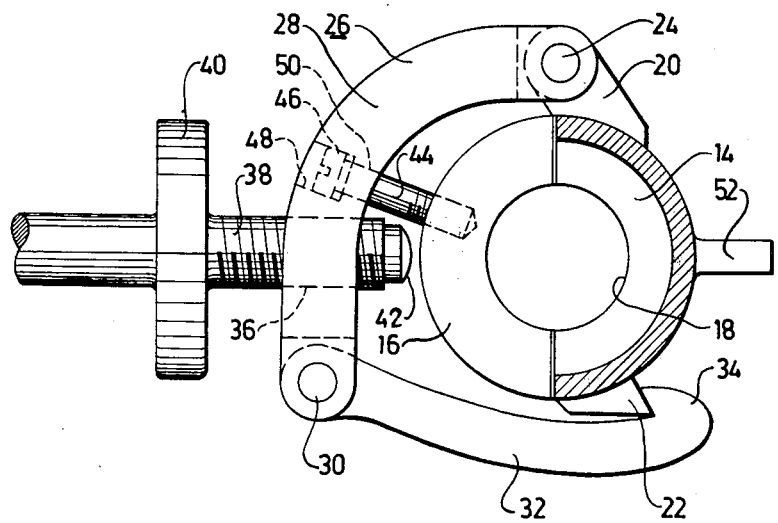
Figure 3:
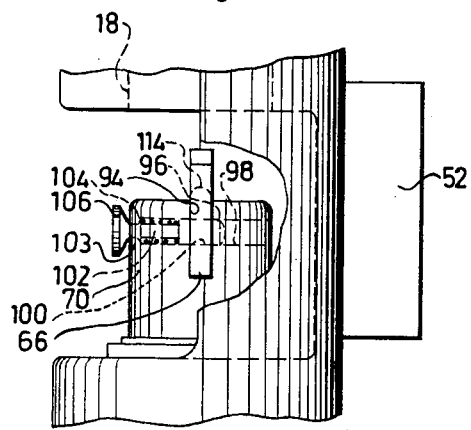

In the accompanying drawing, wherein an illustrative embodiment of the invention is disclosed, Fig. 1 is an axial sectional view through a flanging tool made according to the invention, with one-half of the clamping means removed to disclose construction, and with a pipe end inserted in work position;

Fig. 2 is a sectional view, taken on the line II—II of Fig. 1, looking in the direction of the arrows, but with the half of the clamping means provided in its proper position, and Fig. 3 shows a part of the tool of Fig. 1 as seen from the right in an inverted or upside down position and with a portion cut away.

The reference numeral 10 in the drawing generally indicates the flanging apparatus for the end portion of a metal pipe or tube. The clamping device for the pipe consists of two arcuate jaws 14 and 16 which, when they abut against one another, form a cylinder with a central channel or passage 18 for the reception of the pipe or tube end 12. The outer surface of the jaw 14 is provided with the radial projections 20 and 22. The projection 20 is drilled parallel to the channel 18 to accommodate a pivot pin 24 above which the clamping device generally indicated at 26, and including an arm 28, is pivoted. The other end of the preferably arc-shaped arm 28 is journalled by means of a pivot 30 with one end of another arm 32, the opposite end of which is provided with a hook-shaped portion 34 which engages with the projection 22. In order to urge the jaws 14 and 16 against one another, the arm 28 is provided with a bore at right angles to the axis of the channel 18 and said bore is provided with internal screw-threads 36 which are threadably engaged by a bolt 38. The bolt 38 is provided with a head 40 by which it may be rotatively threaded through the arm 28, and said bolt 38 also has an inner end 42 which engages the outer surface of the jaw 16, thus pressing together the two jaws 14 and 16. There is a connection between the flanging device and the above-described clamping arrangement which connection, in the present example, is achieved by means of a screw 44 which extends at right angles to the axis of the channel 18. One end of the screw 44 is adapted to be screwed into the jaw 16 and the other end is provided with a head 46 which is counter-sunk in a bore 48 formed in the arm 28. This bore 48 continues through the arm 28 with a smaller-diameter portion 50 in which the screw 44 is rotatable. In order to attach it to a screw-piece, the jaw 14 may be provided with an ear 52.

The jaw 14 is formed with a bowl-shaped wall 54 which is provided at one end with a ring-shaped portion 56, the inner surface of which is screw-threaded as shown at 58 to engage with the external threads of a sleeve 60 that is threadable through the ring 56. In the bore 62 of the sleeve 60 is a spindle 64 mounted to rotate but maintained against axial movement. Said spindle carries at one end the forming tool 66. The other end of the spindle 64 is formed square or non-round as at 68 for engagement with a wrench or some similar tool.

The maintenance of the spindle 64 against axial movement with respect to the sleeve 60 is achieved by the fact that the spindle, in the end which supports the tool 66 is provided with a head 70 and a bearing 72 is located between the head 70 and the end of the sleeve 60 and beyond the sleeve 60, or at its top end as viewed in Fig. 1, is provided a flexible ring 74 seated in a track or groove formed in the spindle 64. In order to rotatably connect the spindle 64 with the sleeve 60, there is provided a ring-shaped member or collar 76 keyed to the spindle 64. Said collar 76 is axially movable to a limited extent, but is non-rotatable relatively to the spindle 64.

The collar 76 may be provided with lugs 78 which engage in corresponding recesses 80 provided in the sleeve 60. Axial displacement of the collar 76 in a direction away from the sleeve 60 is limited by means of the flexible ring 82 which is of the same type as the ring 74 and which fits in a groove in the spindle 64. The non-rotatable connection between the spindle 64 and the collar 76 is achieved by means of a semi-circular key 84 which has its rounded portion engaging in a groove in the spindle and its opposite straight portion engaging in a groove 86 in the inner bore of the ring 76. In order to hold the collar 76 in its position of disengagement from the sleeve 60, that is, with its lugs 78 disengaged from the recesses 80, the collar is provided with a radial bore 88 in which a spring-pressed ball 90 is located and which, when the final disengaged position is reached, snaps into a bowl-shaped recess 92 formed in the spindle 64.

The tool 66 which is supported by the lower end of the spindle 64 is, in the present case, provided with a rectangular steel plate which extends in a direction transverse to the spindle 64 and which has its central portion removably inserted in the spindle 64 in a groove 94 provided in the spindle head 70. The maintenance of the plate in the groove 94 is achieved by means of a plunger 96 which is movable through a bore 98 provided in the cylindrical head 70 as well as through the corresponding bore 90 of the tool 66. In order to facilitate the exchange of one work tool 66 for another, the plunger 96 is provided with a portion 102 of smaller diameter than the bore 98 and which carries a spiral spring 104 located between the shoulder formed by the end of the plunger 96 and a stop member 103 in the mouth of the bore 98.

The plunger 96 may be manipulated by means of a head or button 106 located outside of the head 70, and which button 106 is attached to the end of the portion 102 and forms an abutment for limiting the displacement of the plunger 86 in the bore 98.

In the bottom of the groove 94 there is an axial bore 108 for accommodating a centering pin 110 projecting from the work tool 66. The tool 66 is provided with two forming or press surfaces 112 which are formed by recesses provided in the edge of the tool 66 and each of which has a circular contour as will be noted in Fig. 3 at 114. The part 116 of the tool 66, and which is located between the surfaces 112, forms a tapering, tongue-shaped portion which projects beyond the edge of the tool in which the aforementioned forming surfaces 112 are located.

To use the above-described apparatus, the pipe 12 to be flanged is clamped between the jaws 14 and 16 by means of the securing device 26, with the pipe being permitted to project above the jaws to such an extent that the portion of the pipe to be flanged will not contact with the jaws. The collar 76 is then moved toward the sleeve 60 to bring the lugs 78 into engagement with the recesses 80 whereupon the spindle 64 can be caused to rotate by means of a wrench or other suitable tool engaged with the square or non-round 68 of the spindle. Since the spindle is now coupled to the sleeve 60 by means of the collar 76, the sleeve 60 will be axially moved toward the end of the pipe 12 and gradually engage against the same. This engagement is first started by the tapered portion 116 of the tool 66 so that the pipe end will first be bent slightly outwardly or flared. As rotative movement of the spindle 64 continues, the end portion of the pipe comes into contact with the surfaces 112 which actually effect the outward curling or flanging on the pipe as indicated at 120. When the end of the pipe is curled or flanged to thereby produce the rounded, arcuate flange thereon as shown in Fig. 1, the spindle is uncoupled from the sleeve 60 by manually moving the collar 76 upwardly. The turning movement of the spindle 64 may be continued but since it is now no longer coupled to sleeve 60 it will not be axially moved but will rotatively operate against the now-formed flange on the pipe to thereby polish the surface of the same.

As previously described, the tool 66 may be removed from the spindle 64 for the purpose of substituting another tool, and especially for the flanging of pipes or tubes of different diameters. Naturally this will require a corresponding change in the diameter of the channel or passage 18 formed by the jaws 14 and 16, and for this purpose the inner walls of the jaws may be provided with radial recesses 118 which serve as seats for corresponding pins for replacement jaws not shown in the drawing.

In view of the fact that the pipe-gripping device leaves a free contact space for the finished flange, the pipe end to be flanged does not have to be precisely cut, which means that the rear edge indicated at 120 of the formed flange will not always lie in a plane at right angles to the axis of the pipe. By using a flange in a tight coupling device, such as is shown for example in our application Serial No. 763,664, filed September 26, 1958, this condition does not have any special significance for according to the construction shown in said application each flange is supported by a ring-shaped ridge which so engages the flange that the edge 120 of the flange is free and any irregularity therein does not affect the securement of a leakproof joint between pipe ends.

Having described a single embodiment of the invention, it is obvious that the same is not to be restricted thereto, but is broad enough to cover all structures coming within the scope of the annexed claims.

What is claimed is:

1. An apparatus for producing an outwardly-turned flange on the end of a pipe comprising, a clamp having a pair of arcuate jaws between which the pipe to be flanged is held, a spindle carrying a flanging tool, a support for the spindle and in which the spindle is rotative, the support being adjustable to and from the end of the pipe, a slidable collar mounted on the spindle forwardly of the rear end thereof so that a portion of the spindle extends rearwardly beyond the collar, the collar being non-rotative relatively to the spindle, interengaging clutch elements carried by the collar and support for coupling the spindle to the support so that rotative movement of the spindle will move the support in a direction toward the end of the pipe, the collar being capable of movement on the spindle in a manner to permit of disengagement of the clutch elements to thereby allow rotative movement of the spindle without axially moving the spindle or its support, and locking means carried by the collar and engaging against the spindle for holding the collar in disengaged position.

2. In an apparatus for producing an outwardly-turned flange at the end of a pipe, a rotative spindle carrying a flanging tool, said tool consisting of a flat plate having an edge formed with a pair of concavities, a tapered flat tongue on said edge between the concavities, the forward edge of the flat tongue being disposed in advance of the concavities to thereby cause initial flaring of the end of the pipe as the tongue enters into the same in advance of the entry of the end of the pipe into the concavities, a head on the end of the spindle and in which the plate is mounted, a spring-pressed pin extending into the head, and the plate having an opening engaged by said pin to thereby secure the plate in the head means for causing rotation of the spindle while moving the same axially, and selective means for allowing rotation of the spindle without causing axial movement of the same.

3. An apparatus for forming a flange on the end of a pipe comprising, a clamp having jaws between which a pipe is gripped and held against axial movement, one of the jaws being provided with an internally-threaded cylindrical portion, a sleeve threadably adjustable through the cylindrical portion, a spindle rotatively mounted within the sleeve, said spindle having a head carrying a flanging tool, said tool being adapted for engagement against the end of the pipe gripped by the clamp to form an outwardly-curled flange on the pipe by rotative movement of the spindle and sleeve in company with it, a collar keyed to the spindle at a point forwardly of the rear end of the spindle whereby the rear end of the spindle extends out of and beyond the collar for tool engagement, the collar being capable of a limited axial movement on the spindle, said collar having coupling elements for engagement with complementary coupling elements provided on the sleeve when the collar is at one end of its axial movement on the spindle, means for establishing a detachable engagement between the collar and sleeve to hold the collar in uncoupled relation with the sleeve, said collar when coupled to the sleeve by the interengagement of the coupling elements, causing threadable movement of the sleeve on rotative movement of the spindle to thereby cause the flanging tool to form an outwardly-curled flange on the end of the gripped pipe, and the spindle being rotative independently of the sleeve when the collar is in its uncoupled position to thereby enable the spindle to be rotative without axial movement to polish the outwardly-curled end of the pipe.

4. An apparatus for producing an outwardly turned-over flange on the end of a pipe comprising, gripping means for holding the pipe against axial movement, said gripping means exposing an end portion of the pipe for flanging, a spindle mounted for rotative movement and disposed co-axially with the pipe so gripped, a threaded support, a sleeve threadably adjustable through the support to thereby move said sleeve either toward or away from the end of the pipe, the spindle being rotative within the sleeve and having a rear end for engagement by an implement to rotate the spindle, a flanging tool carried at the forward end of the spindle and operative against the end of the pipe to flange the same when the spindle is moved toward the end of the pipe and while the sleeve is threadably moved axially along with the spindle, a collar slidably mounted on the spindle inwardly of the rear end of the spindle whereby said rear end projects rearwardly beyond the collar for engagement by said spindle-rotating implement, said collar having lugs on its forward end, the sleeve having recesses in its rear end for engagement by said lugs for coupling the spindle to the sleeve when the collar is moved axially on the spindle in one direction, the lugs being moved out of said recesses when the collar is moved in the opposite direction, and means on the collar for engaging with the spindle when the lugs are out of the recesses to thereby hold the collar against axial movement.

5. An apparatus for producing an outwardly turned-over flange on the end of a pipe as provided for in claim 4 and wherein the flanging tool consists of a flat plate having a forward edge formed with a pair of arcuate recesses having rounded edges and a tapered flat tongue located between the recesses, the forward edge of the tongue being located in advance of the recesses.

6. An apparatus for producing an outwardly turned-over flange on the end of a pipe comprising, jaws between which a pipe is gripped to hold the same against axial movement, the jaws being shaped to expose an end portion of the pipe for flanging, a spindle mounted for rotative movement and disposed co-axially with a pipe so gripped, a threaded support in which a sleeve is threadably adjustable to move the same toward or away from the end of the pipe, the spindle being rotative within the sleeve, a flanging tool carried by the spindle and operative against the end of the pipe to flange the same as the spindle is moved toward the end of the pipe while being rotated and while the sleeve is threadably moved axially along with the spindle, the flanging tool including a flat plate having a forward edge formed with a pair of recesses to outwardly turn over the edge of the pipe, said tool being provided with a flat tapered tongue between the recesses, said tongue having an edge disposed forwardly of the recesses, a coupling device between the sleeve and spindle, said coupling device consisting of a collar having a limited axial movement on the spindle, interengaging clutch elements on the collar and sleeve, which clutch elements are brought into engagement to couple the spindle with the sleeve when the collar is axially moved on the spindle in one direction, and which clutch elements when disengaged, permit rotative movement of the spindle independently of the sleeve.

References Cited in the file of this patent

UNITED STATES PATENTS

| | | |
|---|---|---|
| 841,388 | Gapp | Jan. 15, 1907 |
| 1,365,915 | Hooker | Jan. 18, 1921 |
| 1,795,358 | Arndt | Mar. 10, 1931 |
| 1,835,179 | Parker | Dec. 8, 1931 |
| 1,935,714 | Hummell | Nov. 21, 1933 |
| 1,940,420 | Kerns | Dec. 19, 1933 |
| 2,242,831 | McIntosh | May 20, 1941 |
| 2,604,139 | Franck | July 22, 1952 |
| 2,711,771 | Wilson | June 28, 1955 |
| 2,727,559 | Franck | Dec. 20, 1955 |
| 2,737,225 | Jasinski | Mar. 6, 1956 |
| 2,773,539 | Franck | Dec. 11, 1956 |
| 2,861,623 | Franck | Nov. 25, 1958 |